(12) United States Patent
Yu et al.

(10) Patent No.: US 7,894,010 B2
(45) Date of Patent: Feb. 22, 2011

(54) LIQUID CRYSTAL DISPLAY PANEL AND METHOD FOR FABRICATING THE SAME

(75) Inventors: Sang Hee Yu, Gunpo-si (KR); Joon Dong Lee, Anysang-si (KR); Deuk Su Lee, Yongin-si (KR)

(73) Assignee: LG Display Co., Ltd., Seoul (KR)

( * ) Notice: Subject to any disclaimer, the term of this patent is extended or adjusted under 35 U.S.C. 154(b) by 232 days.

(21) Appl. No.: 12/289,529

(22) Filed: Oct. 29, 2008

(65) Prior Publication Data

US 2009/0109363 A1 Apr. 30, 2009

(30) Foreign Application Priority Data

Oct. 30, 2007 (KR) .................... 10-2007-109620

(51) Int. Cl.
G02F 1/1333 (2006.01)
G02F 1/1368 (2006.01)
H01L 21/00 (2006.01)

(52) U.S. Cl. .................. 349/43; 349/187; 349/106; 438/30

(58) Field of Classification Search .............. 349/111, 349/187, 56, 42, 43, 104, 106, 122, 138, 349/139, 143, 147, 149; 438/30
See application file for complete search history.

(56) References Cited

U.S. PATENT DOCUMENTS

| 6,014,190 A | * | 1/2000 | Kim et al. | 349/39 |
| 2007/0159586 A1 | * | 7/2007 | Kim et al. | 349/143 |
| 2008/0136990 A1 | * | 6/2008 | Kimura | 349/46 |
| 2009/0109363 A1 | * | 4/2009 | Yu et al. | 349/43 |

* cited by examiner

Primary Examiner—Brian M Healy
(74) Attorney, Agent, or Firm—McKenna Long & Aldridge LLP

(57) ABSTRACT

The present invention relates to a liquid crystal display panel and a method for fabricating the same which can improve aperture and prevent a brightness deviation between lots. The liquid crystal display panel includes a thin film transistor formed on a lower substrate and connected to a gate line and a data line, a pixel electrode connected to a drain electrode of the thin film transistor, a common electrode forming a horizontal electric field with the pixel electrode, a connection electrode overlapped with and connected to the data line, and a black matrix on an upper substrate opposite to the lower substrate for forming a vertical electric field with the connection electrode.

8 Claims, 11 Drawing Sheets

LIQUID CRYSTAL DISPLAY PANEL AND METHOD FOR FABRICATING THE SAME

This application claims the benefit of Korean patent application No. P2007-109620, filed on Oct. 30, 2007, which is hereby incorporated by reference as if fully set forth herein.

BACKGROUND OF THE INVENTION

1. Field of the Invention

The present invention relates to a liquid crystal display panel and a method for fabricating the same. More particularly, the present invention relates to a liquid crystal display panel and a method for fabricating the same which can improve aperture and prevent a brightness deviation between lots.

2. Discussion of the Related Art

In general, a liquid crystal display device displays a picture by controlling a light transmittivity of liquid crystals having dielectric anisotropy with an electric field. The liquid crystal display device controls the light transmittivity of liquid crystals with the electric field for displaying the picture.

Of the liquid crystal display devices, an in-plane switching type liquid crystal display device drives the liquid crystals in an in-plane switch mode with a horizontal electric field formed between pixel electrodes and a common electrode arranged in parallel on a lower substrate.

The in-plane switching type liquid crystal display device includes a thin film transistor substrate and a color filter substrate which are bonded to face each other, spacers for maintaining a cell gap between the two substrates, and liquid crystals filled in the cell gap.

The color filter substrate includes a color filter 34 for displaying colors, a black matrix 32 for preventing light from leaking, and an alignment film coated thereon for alignment of the liquid crystals.

Referring to FIG. 1, formed on a substrate 11 for forming a horizontal electric field of one pixel, there are a pixel electrode (not shown) and a common electrode 22 arranged in parallel, a shielding electrode 24 for shielding a data signal to a data line 14, a thin film transistor connected to the common electrode 22 and the pixel electrode, and an alignment film coated thereon for alignment of liquid crystals.

The in-plane switching type liquid crystal display device has a width of a black matrix 32 formed greater by C taking a light leakage from between the common electrode 22 and the data line 14, i.e., A region, and a bonding process margin (B region) into account. As the width of the black matrix 32 becomes greater, improvement of an aperture of the liquid crystal display panel becomes a problem.

SUMMARY OF THE INVENTION

Accordingly, the present invention is directed to a liquid crystal display panel and a method for fabricating the same.

An advantage of the present invention is to provide a liquid crystal display panel and a method for fabricating the same which can improve aperture and prevent a brightness deviation between lots.

Additional advantages and features of the invention will be set forth in part in the description which follows and in part will become apparent to those having ordinary skill in the art upon examination of the following or may be learned from practice of the invention. These and other advantages of the invention may be realized and attained by the structure particularly pointed out in the written description and claims hereof as well as the appended drawings.

To achieve these and other advantages and in accordance with the purpose of the invention, as embodied and broadly described herein, a liquid crystal display panel includes a thin film transistor formed on a lower substrate so as to be connected to a gate line and a data line, a pixel electrode connected to a drain electrode of the thin film transistor, a common electrode for forming a horizontal electric field with the pixel electrode, a connection electrode overlapped with, and connected to the data line, and a black matrix on an upper substrate opposite to the lower substrate for forming a vertical electric field with the connection electrode.

In another aspect of the present invention, a method for fabricating a liquid crystal display panel includes the steps of providing a thin film transistor substrate including a thin film transistor formed on a lower substrate so as to be connected to a gate line and a data line, a pixel electrode connected to a drain electrode of the thin film transistor, a common electrode for forming a horizontal electric field with the pixel electrode, and a connection electrode overlapped with, and connected to the data line, providing a color filter substrate including a black matrix on an upper substrate opposite to the lower substrate for forming a vertical electric field with the connection electrode, and bonding the thin film transistor substrate and the color filter substrate together.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principles of the invention. In the drawings.

DETAILED DESCRIPTION OF THE INVENTION

Reference will now be made in detail to embodiments of the present invention, examples of which are illustrated in the accompanying drawings FIGS. 2 to 9B. Wherever possible, the same reference numbers will be used throughout the drawings to refer to the same or like parts.

Figure 1:
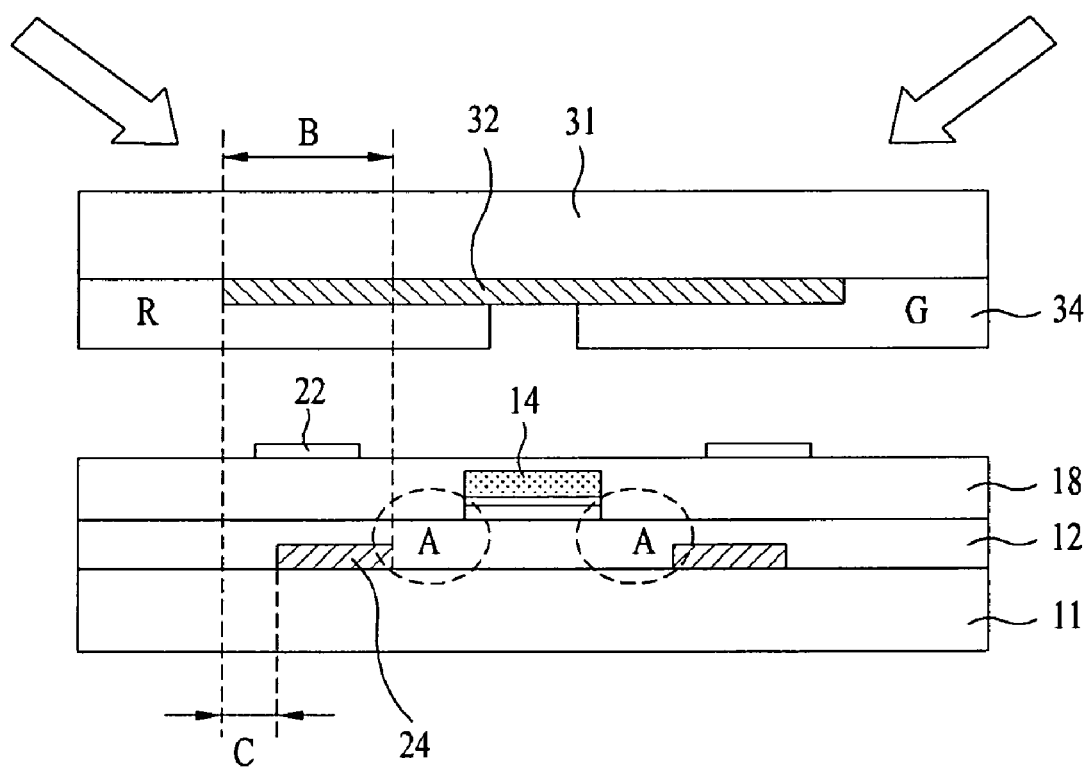
FIG. 1 is a sectional view illustrating a related art liquid crystal display panel.
Figure 2:
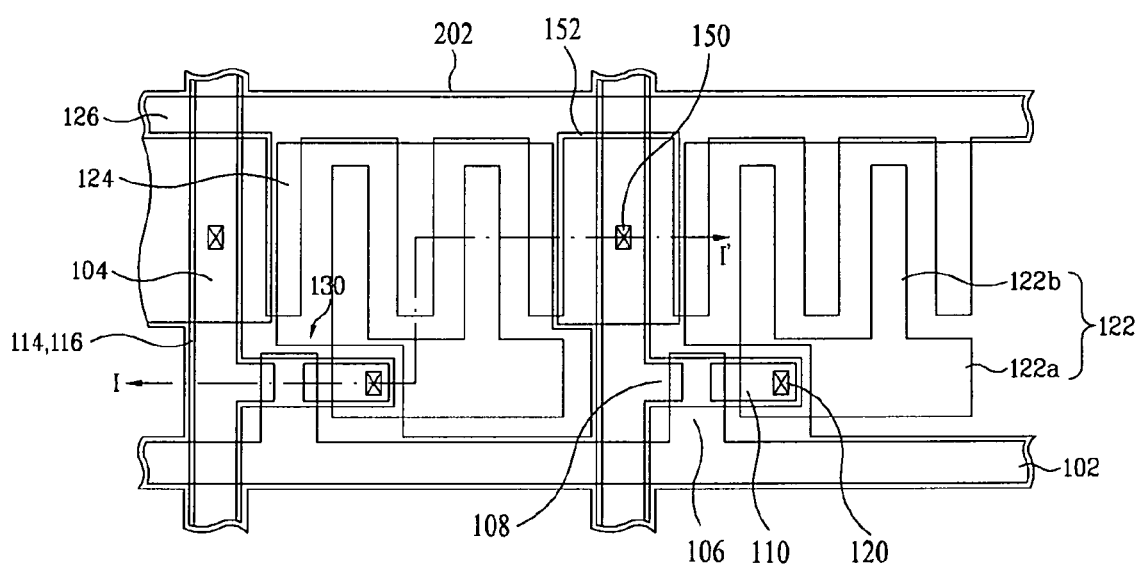
FIG. 2 is a plan view illustrating a liquid crystal display panel in accordance with an embodiment of the present invention.
Figure 3:
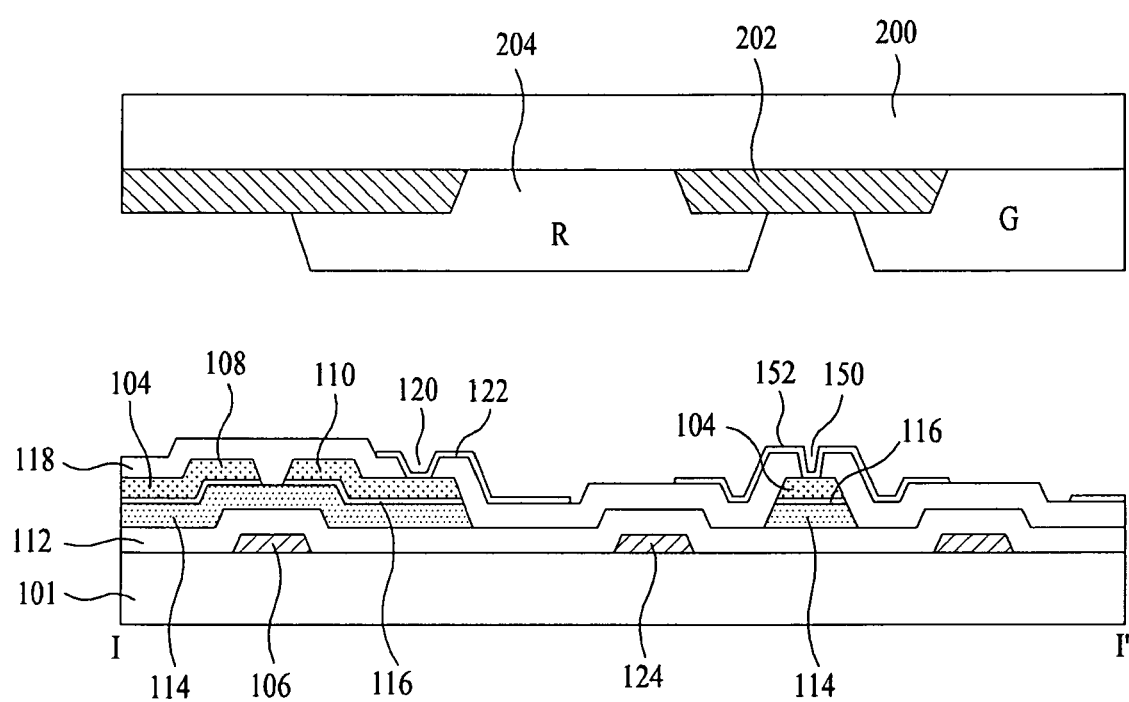
FIG. 3 is a sectional view illustrating the liquid crystal display panel across a line I-I' in FIG. 2.

FIG. 2 is a plan view illustrating a liquid crystal display panel in accordance with an embodiment of the present invention, and FIG. 3 is a sectional view illustrating the liquid crystal display panel across a line I-I' in FIG. 2.

Referring to FIGS. 2 and 3, the liquid crystal display panel includes a color filter substrate and a thin film transistor substrate bonded together with liquid crystals disposed therebetween.

The color filter substrate includes a color filter 204 and a black matrix 202.

The color filter 204 includes red R, green G, and blue B color filters 204 for reproducing colors. The red R, green G, and blue B color filters 204 absorb or transmit lights of specific wave lengths by means of red, green, blue pigments the red R, green G, and blue B color filter 204 contain for displaying the red, green, and blue colors, respectively.

Figure 4:
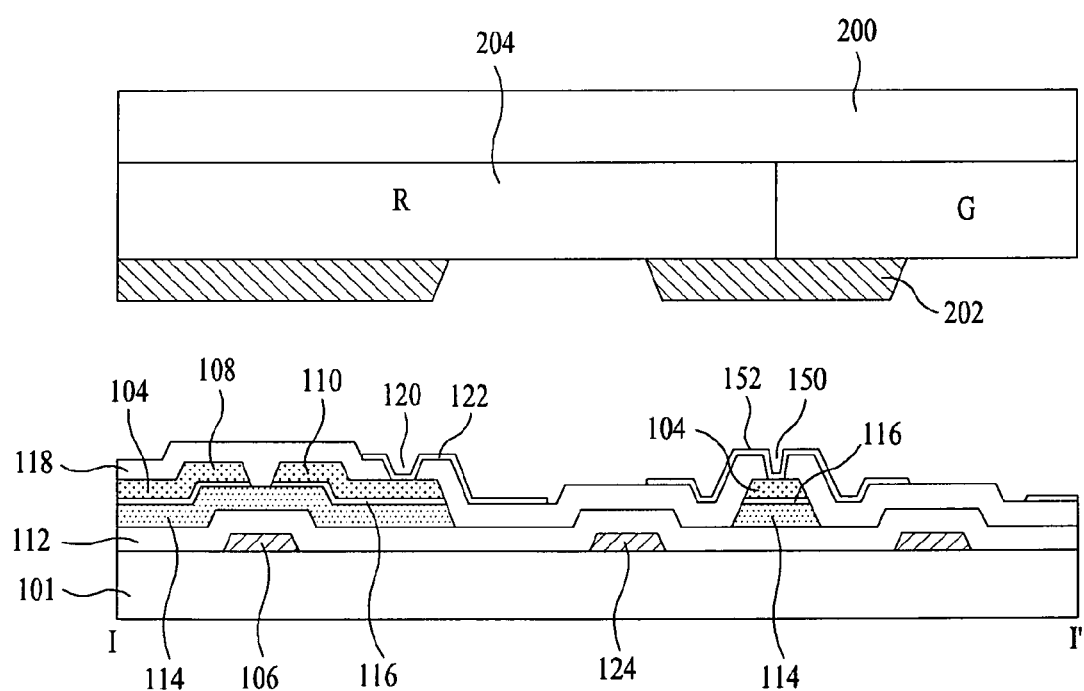
FIG. 4 is a plan view illustrating a color filter substrate of a liquid crystal display panel in accordance with an embodiment of the present invention.

The black matrix 202 marks pixel regions on which the color filters 204 are to be formed and is formed to overlap with a gate line 102, a data line 104, and a thin film transistor 130 on the thin film transistor substrate. The black matrix 202 shields light transmission caused by unwanted liquid crystal alignment for improving a contrast of the liquid crystal display device, and shields direct light direction to the thin film transistor 130 for preventing a light leakage current from the thin film transistor 130. The black matrix 202 is constructed of a metal layer of copper Cu, aluminum Al, chromium Cr, an aluminum alloy, or so on, and has a ground voltage GND applied thereto to form a vertical electric filed with a connection electrode 152. The black matrix 202 may be formed among the red, green, blue color filters 204, or as shown in FIG. 4, on the color filers 204.

In order to make a surface of the color filters 204 or the black matrix flat, an overcoat layer may be formed, additionally.

The thin film transistor substrate has a thin film transistor 130, a pixel electrode 122, a common electrode 124, and a connection electrode 152.

The thin film transistor 130 charges a pixel signal supplied from the data line in response to a scan signal supplied to the gate line to the pixel electrode 122 and maintains the pixel signal charged at the pixel electrode 122. To do this, the thin film transistor 130 has a gate electrode 106, a source electrode 108, a drain electrode 110, an active layer 114, and an ohmic contact layer 116.

The gate electrode 106 is connected to the gate line 102 for having the scan signal supplied thereto from the gate line 102. The source electrode 108 is connected to the data line 104 for having the pixel signal supplied thereto from the data line 104. The drain electrode 110 formed opposite to the source electrode 108 with a channel portion of the active layer 114 disposed therebetween for supplying the pixel signal from the data line 104 to the pixel electrode 122. The active layer overlapped with the gate electrode 106 with a gate insulating film 112 disposed therebetween to form the channel portion between the source and the drain electrodes 108, and 110. The ohmic contact layer 116 is formed between the source electrode 108 and the drain electrode 110 and the active layer 114, i.e., on the active layer 114 excluding the channel portion. The ohmic contact layer 116 serves to reduce electric contact resistance between the source and drain electrodes 108 and 110 and the active layer 114. A semiconductor pattern including the active layer 114 and the ohmic contact layer 116 is overlapped, not only with the source and drain electrodes 108 and 110, but also with a data metal pattern including the data line 104 in view of fabrication process.

The pixel electrode 122 is connected to the drain electrode 110 of the thin film transistor 130 through a pixel contact hole 120. According to this, the pixel electrode 122 has the pixel signal supplied thereto from the data line 140 through the thin film transistor 130. The pixel electrode 122 has a first electrode portion 122a parallel to the gate line 102, and a second electrode portion 122b extended from the first electrode portion 122a perpendicular thereto.

The common electrode 124 is connected to the common line 126 for having a common voltage supplied thereto through the common line 126. The common electrode 122 is formed of the same material with the pixel electrode 122 on the same plane, or the same material with or a material different from the pixel electrode 122 on a plane different from the pixel electrode 122. In the present invention, a case will be described as an example in which the common electrode 124 is formed on the substrate 101 as a gate metal layer, the pixel electrode 122 is formed on the protective film 118 as a transparent conductive layer, such that the common electrode 124 and the pixel electrode 122 are formed on planes and of materials different from each other.

The common electrode 124 is formed parallel to the second electrode portion 122b of the pixel electrode 122. According to this, a horizontal electric field is formed between the pixel electrode 122 having the pixel voltage signal supplied thereto and the common electrode 124 having the common voltage supplied thereto. The horizontal electric field rotates the liquid crystal molecules aligned in a horizontal direction between the thin film transistor substrate and the color filter substrate owing to dielectric anisotropy. The transmittivity of light through the sub-pixel region varies with extents of rotation of the liquid crystal molecules, to produce a picture.

The connection electrode 152 is connected to the data line 104 through a second contact hole 150 in the protective film 118. The connection electrode 152 overlaps with the common electrode 124 partially with the gate insulating film 112 and the protective film 118 disposed therebetween. According to this, the connection electrode 152 prevents a light from leaking through a gap between the data line 104 and the common electrode 124. In this instance, as the connection electrode 152 and the data line 104 are in contact, a total resistance of the data line 104 is reduced, and pixel signals are supplied to the data line 104 as well as to the connection electrode 152 in contact with the data line 104 too, making the data line 104 and the connection electrode 152 to be on the same level.

Though a width of the black matrix 202 has been formed greater for preventing a light from leaking through the gap between the data line 104 and the common electrode 124 and securing a bonding process margin, the partial overlap of the connection electrode 152 and the common electrode 124 eliminates the necessity for forming the width of the black matrix 202 greater. Eventually, as the width of the black matrix 202 is reduced together with a width of an outermost common electrode 124 adjacent to the data line 104, the aperture of the liquid crystal display panel can be improved. Moreover, the prevention of light leakage and the securing of the bonding process margin permit to prevent a brightness deviation between lots from taking place.

By applying the ground voltage GND to the black matrix 202 opposite to the connection electrode 152, a vertical electric field is formed between the connection electrode 152 and the black matrix 202. According to this, crosstalk caused by parasitic capacitor between the data line 104 and the pixel electrode 122 can be prevented.

In the meantime, if static electricity is generated at the liquid crystal display panel, the static electricity is dispersed owing to an electric field between the connection electrode 152 and the black matrix 202 having a plurality of gate lines 102 and data lines 104 formed thereon. According to this, by removing ITO (Indium Tin Oxide) formed on the color filter substrate for prevention of the static electricity, the transmittivity can be improved.

Accordingly, though the transmittivity is reduced due to the ITO (Indium Tin Oxide) formed for prevention of the static electricity that blocks an external light, the transmittivity can be improved by removing the ITO.

Figure 5A:
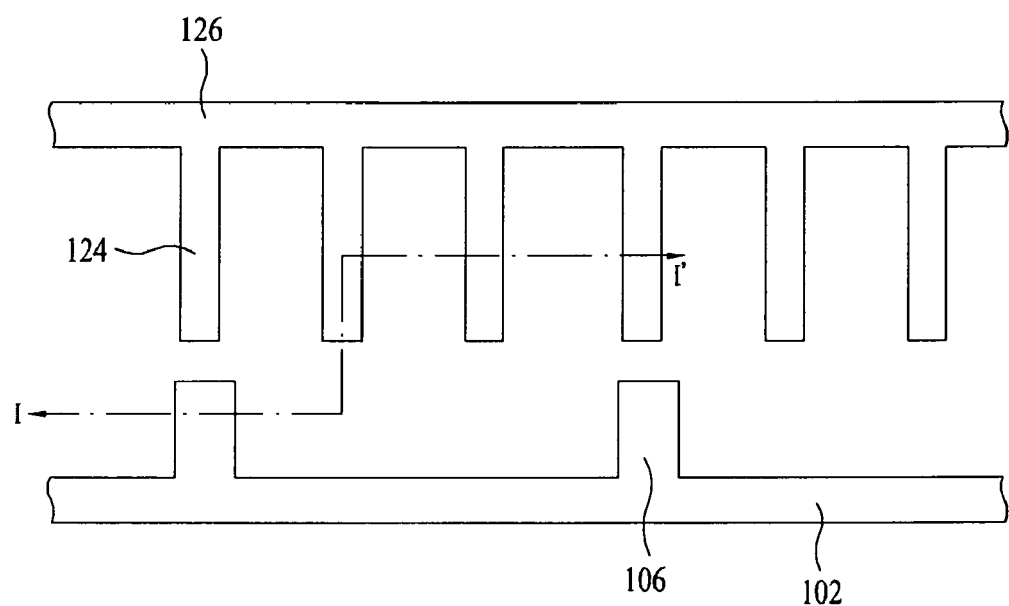
FIGS. 5A and 5B are a plan view and a sectional view for describing a method for fabricating the gate metal pattern shown in FIGS. 2 and 3, respectively.
Figure 5B:
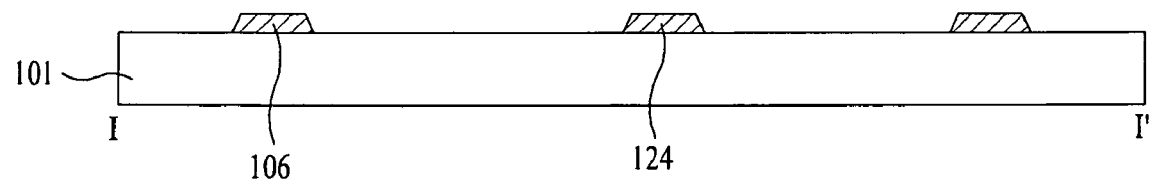

FIGS. 5A and 5B are a plan view and a sectional view for describing a method for fabricating the gate metal pattern shown in FIGS. 2 and 3, respectively.

Referring to FIGS. 5A and 5B, a gate metal pattern including a gate line 102, a gate electrode 106, a common line 126, and a common electrode 124 is formed on a lower substrate 101.

In detail, a gate metal layer is deposited on the lower substrate 101 by sputtering or the like. The gate metal layer may be constructed of a single layer of metal, such as Mo, Ti, Cu, AlNd, Al, Cr, Mo alloys, Cu alloys, Al alloys, or a stack of two or more than two layers of above metals. Then, by photolithography and etching, the gate metal layer is patterned, to form the gate metal pattern including the gate line 102, the gate electrode 106, the common line 126, and the common electrode 124.

Figure 6A:
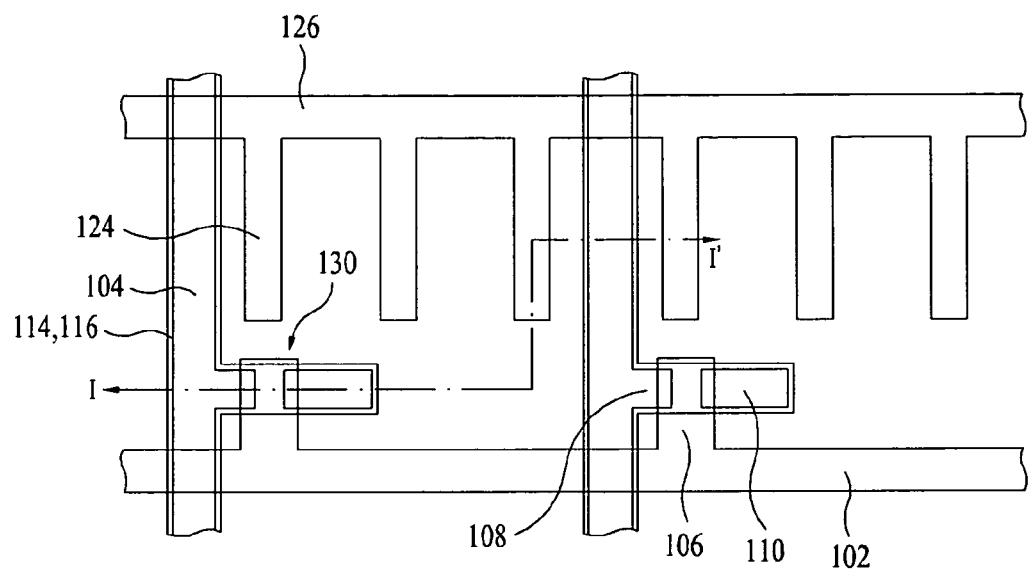
FIGS. 6A and 6B are a plan view and a sectional view for describing a method for fabricating the semiconductor pattern and the data metal pattern shown in FIGS. 2 and 3, respectively.
Figure 6B:
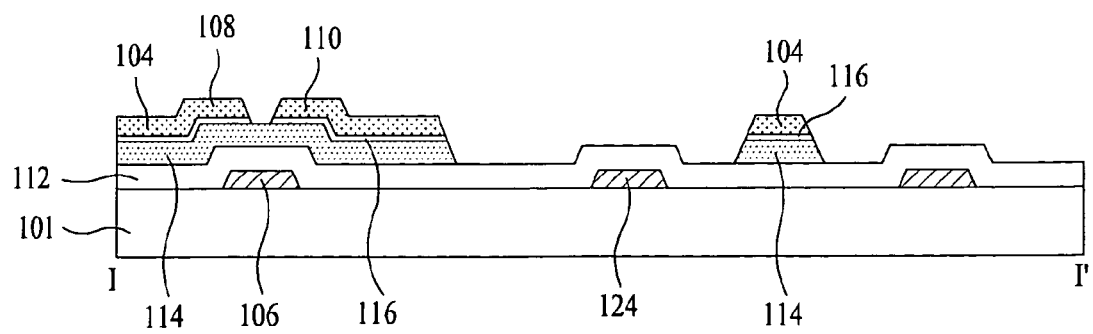

FIGS. 6A and 6B are a plan view and a sectional view for describing a method for fabricating the semiconductor pattern and the data metal pattern shown in FIGS. 2 and 3, respectively.

Referring to FIGS. 6A and 6B, a gate insulating film 112 is formed on the lower substrate 101 having the gate metal pattern formed thereon, and a data metal pattern including a data line 104, a source electrode 108, and a drain electrode 110 and a semiconductor pattern including an active layer 114 and an ohmic contact layer 116 overlapped under and along the data metal pattern are formed on the gate insulating film 112. The semiconductor pattern and the data metal pattern are formed by one mask process using a slit mask or a half tone.

In detail, on the lower substrate 101 having the gate metal pattern formed thereon, the gate insulating film 112, an amorphous silicon layer, an amorphous silicon layer doped with impurities $n^+$ or $p^+$, and a data metal layer are formed in succession. Then, after coating photoresist on the data metal layer, the photoresist is subject to exposure and development by photolithography using a slit mask, to form a photoresist pattern having a step.

By etching using the photoresist pattern having a step, the data metal layer is patterned, to form the data metal pattern, and the underlying semiconductor pattern.

Then, the photoresist pattern is ashed by using an ashing process using oxygen $O_2$ plasma. By etching using the ashed photoresist pattern, the data metal pattern exposed thus and the underlying ohmic contact layer are removed, to separate the source electrode 108 and the drain electrode 110, and expose the active layer 114. Then, the photoresist pattern remained on the data metal pattern is removed by stripping.

Figure 7A:
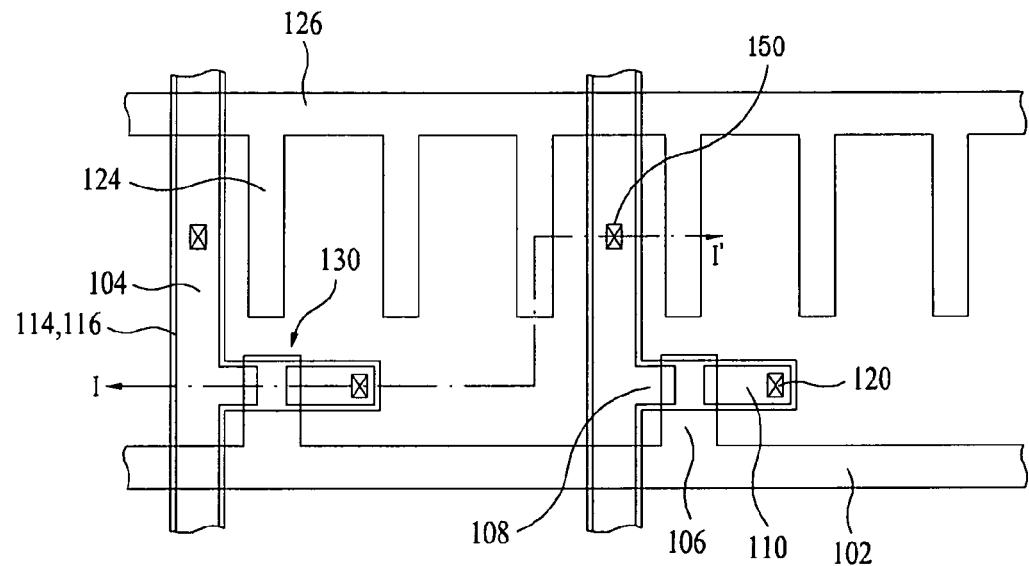
FIGS. 7A and 7B are a plan view and a sectional view for describing a method for fabricating the protective film shown in FIGS. 2 and 3, respectively.
Figure 7B:
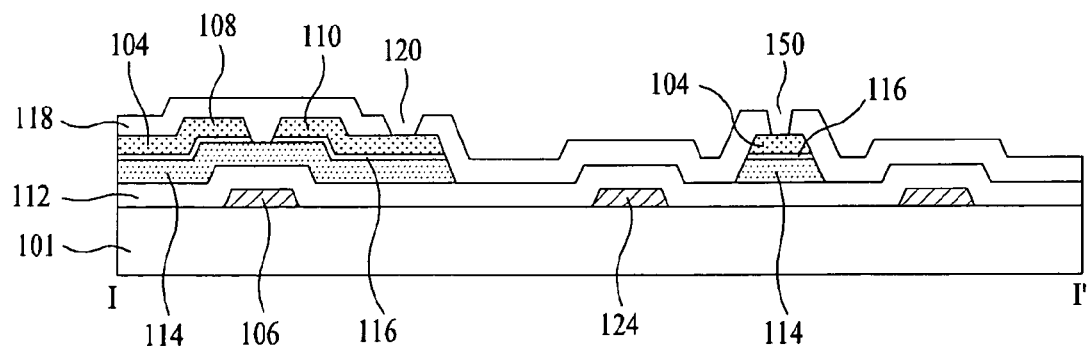

FIGS. 7A and 7B are a plan view and a sectional view for describing a method for fabricating the protective film shown in FIGS. 2 and 3, respectively.

Referring to FIGS. 7A and 7B, a protective film 118 is formed on the gate insulating film 112 having the data metal pattern formed thereon.

In detail, the protective film 118 is formed of an inorganic insulating material the same with the gate insulating film 112 or an organic insulating film such as acryl resin. By patterning the protective film 118 by photolithography and etching, a first contact hole 120 and a second contact hole 150 passed through the protective film 118 are formed. The first contact hole 120 is passed through the protective film 118 to expose the drain electrode 110, and the second contact hole 150 is passed through the protective film to expose the data line 104.

Figure 8A:
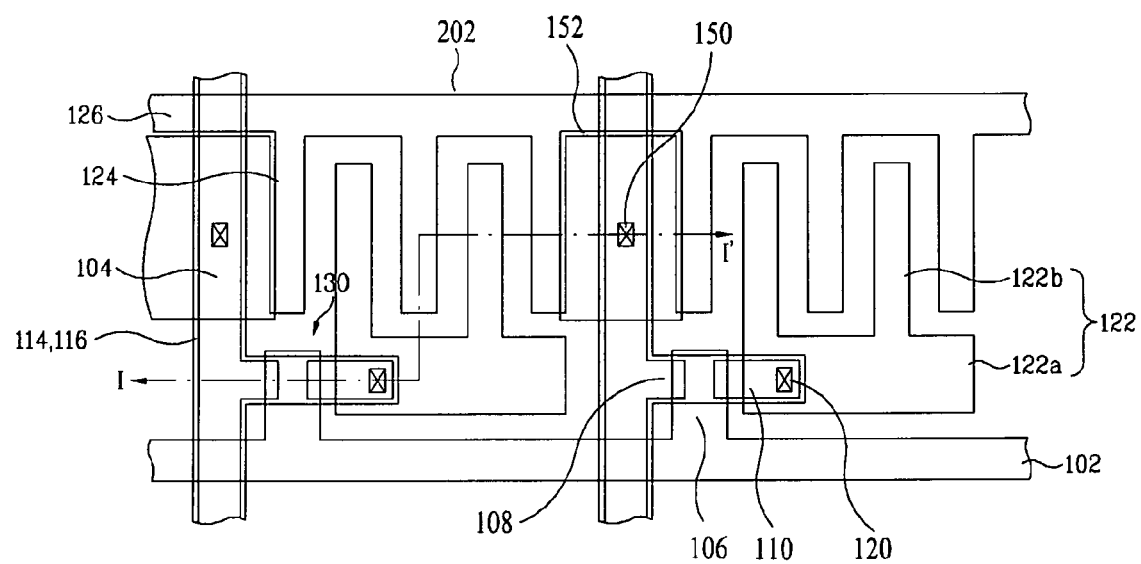
FIGS. 8A and 8B are a plan view and a sectional view for describing a method for fabricating a pixel electrode and a connection electrode, respectively.
Figure 8B:
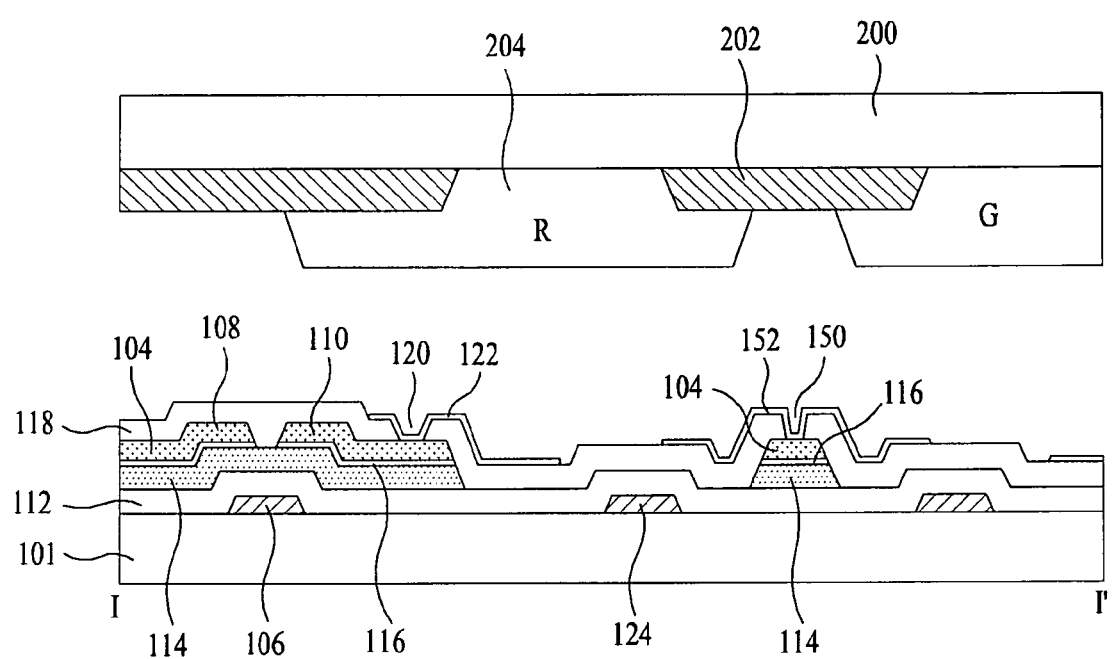

FIGS. 8A and 8B are a plan view and a sectional view for describing a method for fabricating a pixel electrode and a connection electrode, respectively.

Referring to FIGS. 8A and 8B, on the protective film 118, a conductive film pattern including a pixel electrode 122 connected to the drain electrode 110, and a connection electrode 152 connected to the data line 104 is formed.

In detail, a transparent, or non-transparent conductive layer is formed on the protective film 118 by deposition, such as sputtering.

The transparent conductive layer is formed of tin oxide TI, indium tin oxide ITO, indium zinc oxide IZO, indium tin zinc oxide ITZO, or so on. The non-transparent conductive layer is formed of Cr, Mo, Cu, Al, a molybdenum alloy, a molybdenum titan alloy, an aluminum alloy, or so on. By patterning the transparent, or non-transparent conductive layer by photolithography and etching, the conductive film pattern including the pixel electrode 122, and the connection electrode 152 are formed.

Figure 9A:
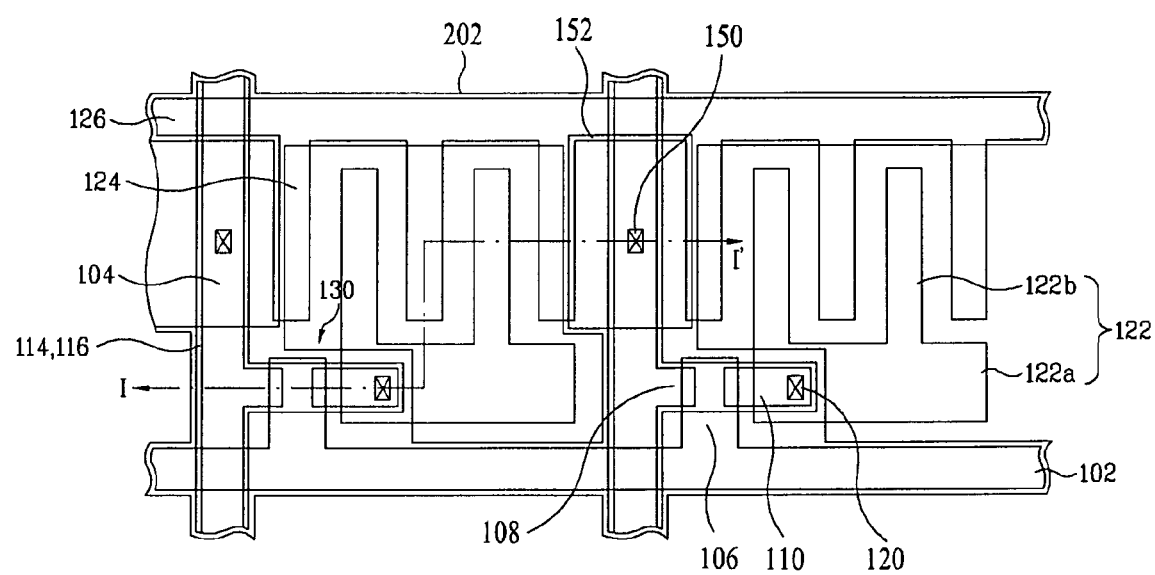
FIGS. 9A and 9B are sectional views of a liquid crystal display panel in accordance with a preferred embodiment of the present invention.
Figure 9B:
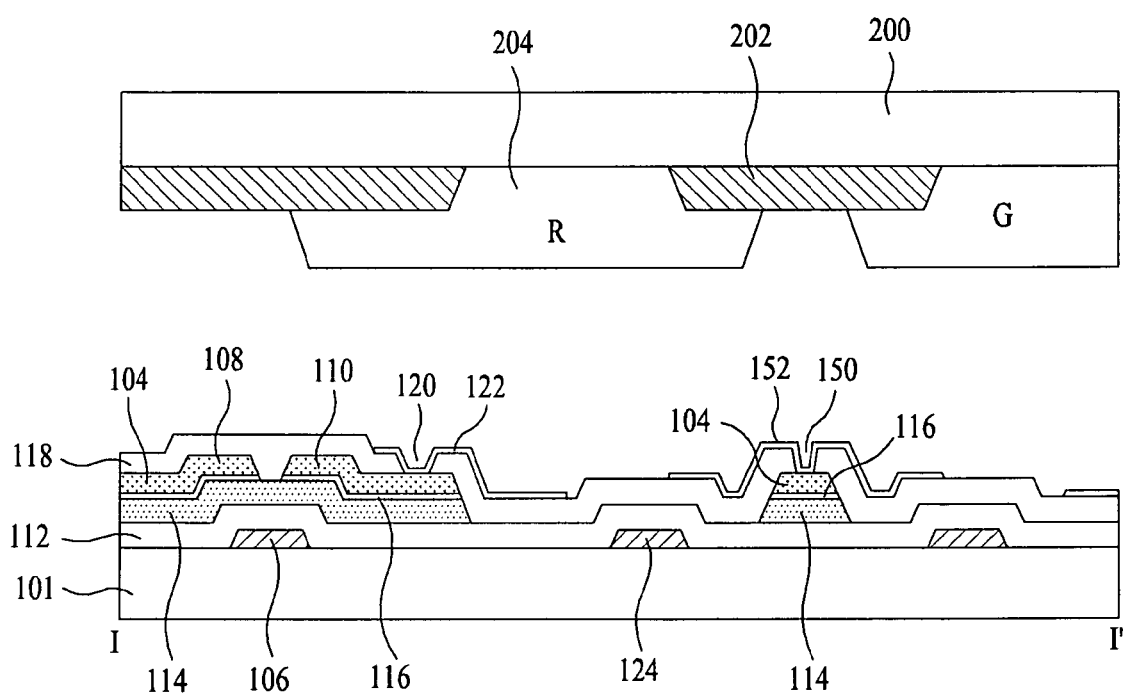

Eventually, the liquid crystal display panel is formed as shown in FIGS. 9A and 9B by bonding the thin film transistor substrate, and the color filter substrate having red R, green G, and blue B color filters 204 formed on a lower substrate for reproducing red R, green G, and blue B colors and a black matrix 202 formed on or under the color filters 204 both formed as shown in FIGS. 5A to 8B together.

As has been described, the liquid crystal display panel and the method for fabricating the same have the following advantages.

The connection electrode connected to the data line and partially overlapped with the common electrode adjacent to the data line with the protective film and the gate insulating film therebetween permits to prevent a light from leaking through a gap between the data line and the common electrode. The prevention of the leakage of light with the connection electrode permits to reduce a width of the black matrix, and a line width of the common electrode, which improves aperture and compensate for a brightness deviation between lots. Moreover, by applying a ground voltage to the black matrix to form a vertical electric field with the connection electrode, a crosstalk can prevented, caused by a parasitic capacitor formed between he pixel electrode and the data line.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display panel comprising:
   a thin film transistor formed on a lower substrate so as to be connected to a gate line and a data line;
   a pixel electrode connected to a drain electrode of the thin film transistor;
   a common electrode for forming a horizontal electric field with the pixel electrode;
   a connection electrode overlapped with, and connected to the data line; and
   a black matrix formed of a metal layer on an upper substrate opposite to the lower substrate for forming a vertical electric field with the connection electrode,
   wherein the black matrix has a ground voltage supplied thereto.

2. The panel according to claim 1, wherein the connection electrode is formed of the same material and on the same plane with the pixel electrode.

3. The panel according to claim 1, wherein the connection electrode partially overlaps with the common electrode adjacent to the data line so as to be insulated therebetween.

4. The panel according to claim 1, wherein the black matrix is formed on or under the color filters formed on the upper substrate.

5. A method for fabricating a liquid crystal display panel, comprising:
   providing a thin film transistor substrate including a thin film transistor formed on a lower substrate and connected to a gate line and a data line, a pixel electrode connected to a drain electrode of the thin film transistor, a common electrode forming a horizontal electric field with the pixel electrode, and a connection electrode overlapped with, and connected to the data line;
   providing a color filter substrate including a black matrix formed of a metal layer on an upper substrate opposite the lower substrate for forming a vertical electric field with the connection electrode; and
   bonding the thin film transistor substrate and the color filter substrate together,
   wherein the black matrix has a ground voltage supplied thereto.

6. The method according to claim 5, wherein providing the thin film transistor substrate includes:
   forming a gate metal pattern including the gate line, a gate electrode, a common line, and the common electrode on the lower substrate;
   forming a gate insulating film on the lower substrate having the gate metal pattern formed thereon;
   providing a data metal pattern including the data line, a source electrode, and the drain electrode and a semiconductor pattern including an active layer and an ohmic contact layer overlapped under and along the data metal pattern on the gate insulating film;
   forming a protective film including a first contact hole and a second contact hole on the lower substrate having the data metal pattern formed thereon; and
   forming a conductive film pattern including the pixel electrode connected to the drain electrode through the first contact hole, and the connection electrode connected to the data line through the second contact hole and formed of the same material on the same plane with the pixel electrode.

7. The method according to claim 5, wherein the connection electrode partially overlaps with the common electrode adjacent to the data line so as to be insulated therebetween.

8. The method according to claim 5, wherein the black matrix is formed on or under the color filters formed on the upper substrate.

* * * * *